(12) United States Patent
Devitt et al.

(10) Patent No.: US 8,407,162 B2
(45) Date of Patent: Mar. 26, 2013

(54) ARRANGEMENT AND METHOD FOR NETWORK MANAGEMENT

(75) Inventors: Ann Devitt, Dublin (IE); Boris Danev, Dublin (IE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 786 days.

(21) Appl. No.: 12/517,798

(22) PCT Filed: Dec. 7, 2006

(86) PCT No.: PCT/EP2006/069436
§ 371 (c)(1),
(2), (4) Date: Jun. 4, 2009

(87) PCT Pub. No.: WO2008/067852
PCT Pub. Date: Jun. 12, 2008

(65) Prior Publication Data
US 2010/0049676 A1    Feb. 25, 2010

(51) Int. Cl.
*G06F 15/18* (2006.01)
*G06F 15/173* (2006.01)
*G06F 7/60* (2006.01)

(52) U.S. Cl. .................. 706/12; 706/8; 709/223; 703/2

(58) Field of Classification Search ........................ None
See application file for complete search history.

(56) References Cited

U.S. PATENT DOCUMENTS

| | | |
|---|---|---|
| 2003/0126501 A1 | 7/2003 | Musman |
| 2004/0153429 A1 | 8/2004 | Horn et al. |
| 2004/0249776 A1 * | 12/2004 | Horvitz et al. .................. 706/21 |
| 2005/0004930 A1 * | 1/2005 | Hatta ............................ 707/102 |

OTHER PUBLICATIONS

PCT International Search Report, dated Sep. 10, 2007, in connection with International Application No. PCT/EP2006/069436.
Nadkarni, S. et al. "A causal mapping approach to constructing Bayesian networks" Decision Support Systems, Elsevier Science Publishers, Amsterdam, NL, vol. 38, No. 2, Nov. 2004, pp. 259-281, XP004549931, ISSN: 0167-9236.
Mizoguchi, R. "Tutorial ontological engineering—Part 1: Introductions to Ontological Engineering", 2003.
Baader, F. et al. "Description Logics" Handbook on Ontologies, Ed. Springer, 2004.
Angele, J. et al. "Ontologies in F-Logic" Handbook on Ontologies, Ed. Springer, 2004.
Harth, A. et al. "d20.2v02: OWL—Lite reasoning with rules", 2004.

* cited by examiner

*Primary Examiner* — Alan Chen
(74) *Attorney, Agent, or Firm* — Potomac Patent Group PLLC

(57) ABSTRACT

The present invention relates to an arrangement for network management and adapted to be provided in or associated with a network node to be managed. It comprises, or is in communication with, modeling means adapted to, using substantially non-formal descriptions, model network domain and behavior using formal ontologies comprising inference capabilities by means of an inference engine, thus providing a formal ontology model describing domain and behavior. It also comprises annotating means adapted to add semantic information to the formal domain and behavior ontology model, generating means adapted to, using said formal ontology model and said inference engine, elaborate an algorithm adapted to generate and update a probabilistic causal network graph structure representing the domain and its behavior.

31 Claims, 12 Drawing Sheets

ARRANGEMENT AND METHOD FOR NETWORK MANAGEMENT

TECHNICAL FIELD

The present invention relates to an arrangement for network management which is adapted to be provided in or associated with a network node to be managed.

The invention also relates to a method for network management.

BACKGROUND

Network management becomes more and more complicated as well as the requirements or expectations on network operators that they should be able to offer user-centric end-to-end always-best connectivity. A complicating factor is that the networks increasingly become more heterogeneous and complex. Future networks will basically be service-driven and the user will expect constant service availability on any network to which the user has access. These networks will consist of a large variety of different access and core networks and be required to offer many services simultaneously. They will also exhibit considerably more dynamic behaviour than current networks do in order to be able to quickly, practically in real-time, adapt to end user needs for best quality of experience (QoE) as well as operator needs for optimal resource management at a reasonable operator expenditure (OPEX).

This complexity of the communication network will in turn require complex, distributed and preferably, to a large extent, self-adaptive network management systems. There will thus be a need for network management techniques supporting distributed autonomous self-managed networks. Therefore policy-based network management has been suggested which attempts to deploy expert knowledge in the network about services, interaction between services, user preferences and strategic views of businesses to allow the network to make decisions on how to manage these services in a dynamic, heterogeneous multi-service environment.

In for example policy driven, distributed and self-managed networks the devices of the network exhibit individual behaviour in order to fulfill a service and/or user requirements. Such an individual behaviour will affect the network as a whole. Therefore, to be able to observe the behaviour of the network becomes critical for purposes such as forecasting and detection of undesired behaviour, malfunctioning etc.

In order to be able to monitor the behaviour of the network and/or network devices, the management system must monitor events relevant to the network device, i.e. what it is doing, and the status of the network device, i.e. how it is doing. For conceptual monitoring of behaviour, it should be possible to describe the entity, for example a service and its features to be monitored and to build a model that observes the entity. "Tutorial ontological engineering—Part 1: Introductions to Ontological Engineering", 2003 by R. Mizoguchi, describes a way to represent knowledge based on ontological engineering. Ontological engineering focuses on how concepts can be captured in a given domain with the purpose of sharing a common understanding of this domain and to thus enable interoperability and knowledge reuse. Ontologies are taxonomies of concepts and their attributes in a given domain together with a formal representation of domain assumptions. Formal here means that it is semantically rich and based on a well-understood logical paradigm such as Description Logics, c.f. "Description Logics", Handbook on Ontologies, Springer, Ed., 2004 by F. Baader et al. or Frame Logics, c.f. "Ontologies in F-logic", in Handbook on Ontologies: Springer, 2004, by J. Angele and G. Lausan. Formal ontologies are thus based on well-defined semantics enabling machine-readability and reasoning about information through various inference (reasoning) capabilities being supported, c.f. "d20.2v02: OWL—Lite reasoning with rules", 2004 by A. Harth and S. Decker.

Probabilistic graphical models provide a means to monitor behaviour by specifying the dependencies (and independencies) that hold between aspects of a system. So called Bayesian networks (BN), as e.g. discussed in "Bayesian Networks and Decision graphs", New York: Springer-Verlag, 2001, by F. V. Jensen, are a subset of probabilistic graphical models based on directed acyclic graphs. BNs are currently used to monitor different types of behaviour, for example power consumption or fault propagation. A BN consists of a graphical structure, where nodes represent statistical variables from an application domain and arcs the influential relationships between them, as well as an associated numerical part, encoding the conditional probability distribution over these variables. The conditional probability distribution encodes the probability that the variables assume their different values given the values of other variables in the BN.

The purpose of employing ontological representations is to capture concepts in a given domain in order to provide a shared common understanding of said domain, enabling interoperability and knowledge reuse, but also machine-readability and reasoning about information through inferencing. Ontological representations are deterministic and consist of concepts and facts about domains and their relationships to each other.

The purpose of Bayesian networks is to provide a means for estimating complex probabilities of states based on graphical models of a domain. They also provide a structured representation of knowledge and specify the relationship between concepts (or variables) of a domain. BNs are probabilistic, encoding the probability that variables assume particular values given a value of their parent variables in the BN structure.

Ontologies and Bayesian Networks have independently been used to facilitate machine reasoning and decision making.

BNs have predominantly been applied for fault management purposes.

The task of building a Bayesian Network is extremely complex and knowledge-intensive. It requires identification of relevant statistical variables in the application domain, specification of causality relations between these variables and assignment of initial probabilities for the numerical part of the BNs. The BN structure may be defined by hand or derived from data. Building BNs by hand requires a lot of human expert knowledge in the application domain, is extremely laborious and cannot be automated. On the other hand, deriving BNs from data requires enormous amounts of data and the BN structure must then be validated by human evaluators or with reference to human-annotated data.

US 2004/0153429 describes an approach for automatical creation of causal networks (Bayesian network). However, it relies on a well-defined data structure directly relevant to the BN generation that a user can fill in and then the generation of the BN is done automatically by some piece of software. The data structure is not generic and cannot be reused for other purposes. Thus, it is not flexible and its applicability is very limited.

Thus, although it has been realized that it would be attractive to be able to use probabilistic, causal networks, for example Bayesian Networks, within network management their use has practically been limited to fault management due to the extremely complex and knowledge intensive task of building a Bayesian Network. Further it is neither realistic to build BNs by hand, i.e. to derive graph structures manually, which is very complex, requiring domain as well as BN knowledge, nor to rely on well-defined data structures which would result in rigid, inflexible systems.

SUMMARY

It is an object of the present invention to provide an improved arrangement for network management to be provided in or associated with a network node which particularly is capable of handling complex, heterogeneous networks offering a large number of different services. It is particularly an object of the invention to suggest an arrangement for network management which is distributed and self-adaptive and which particularly provides for network management fulfilling operator needs for optimal network management at a reasonable operator expenditure as well as end user requirements on best quality of experience. Particularly it is an object of the invention to provide a self-managed, distributed network management arrangement enabling observation of behaviour relevant for network management purposes, to represent knowledge in order to be able to detect and forecast undesired behaviour. Particularly it is an object to provide an arrangement which allows for making the optimal decisions for self-management. Particularly it is an object to provide a network management arrangement able to, in a highly automated and flexible way, derive representation models for observation purposes.

A particular object is to provide a network management arrangement enabling observation behaviour of services, for example web-services or semantic web-services, which a network, or individual network device, offers for management operation.

Most particularly it is an object to provide a means to facilitate creation of probabilistic causal networks, e.g. BNs.

It is also an object of the present invention to suggest a method for network management through which one or more of the above mentioned objects can be achieved.

In order to meet one or more of the above mentioned objects, an arrangement is provided which comprises or is in communication with (connected to) modelling means for, using substantially non-formal descriptions, modelling network domain and behaviour using formal ontologies comprising providing a formal ontology model domain and behaviour description model and inference capabilities, annotating means adapted to add semantic information to the formal ontology domain and behaviour model, generating means adapted to elaborate an algorithm adapted to generate and update a probabilistic causal network graph structure using said formal ontology model and said inference capabilities. The formal ontologies provide a structured representation of knowledge. Ontologies are deterministic and consist of concepts and facts about a domain and their relationships to each other. A probabilistic causal network graph structure is a means for estimating complex probabilities of states based on graphical models of a domain. Probabilistic graph structures are also a structured representation of knowledge and specify the relationships between concepts (or variables) of a domain. These relationships denote the dependencies and independencies that hold between the concepts or variables and they are probabilistic.

The invention also provides a method for network management implemented in a network node. The method comprises the steps of; modelling network domain and behaviour models from substantially non-formal descriptions by using formal ontologies comprising inference capabilities, providing a formal ontology domain and behaviour description or model; adding, in an annotating step, semantic information to the domain and behaviour formal ontology model; elaborating an algorithm adapted to generate, and preferably also update, a probabilistic causal graph structure using said formal ontology model and said inference capabilities.

It is an advantage of the invention that an excellent means for network management is provided which is capable of efficiently, flexibly and at an acceptable operator expenditure manage a network node at the same time as meeting users demands. A particular advantage of the invention is that an arrangement supporting distributed network management and a corresponding method are provided through which enable efficiently and reliably observing the network or the network device behaviour. They also enable detection or forecasting of for example undesired behaviour related to overload, congestion and make appropriate decisions for self-management. It is also an advantage that a management arrangement is provided which offers an optimized decision making facility for self-management. It is also an advantage that an arrangement and a method respectively is provided which allows a highly automated and also flexible way to derive consistent probabilistic graph models, e.g. Bayesian Networks, for observation purposes.

A further advantage of the invention is that probabilistic graph models or graph structures can be provided as well as causal relationships between the nodes without requiring experts to know in depth the domain and the interrelationships between entities in the domain. It is also an advantage that the tasks of experts are facilitated and that the amount of expert intervention can be reduced. It is also an advantage of the invention that probabilistic graph models can be created which are close to an agreed concept of the domain and the service provided, and which are easy to interpret, also for non-experts.

Particularly it is an advantage of the invention that an adaptive self-configuring network management arrangement is provided which supports and facilitates machine decision making processes, provides for an adaptive functionality, which is automated, and which furthermore enables monitoring and prediction of behaviour, which consequently enables the taking of appropriate measures in due time.

BRIEF DESCRIPTION OF THE DRAWINGS

The invention will in the following be more thoroughly described, in a non-limiting manner, and with reference to the accompanying drawings, in which.

DETAILED DESCRIPTION

Figure 1:
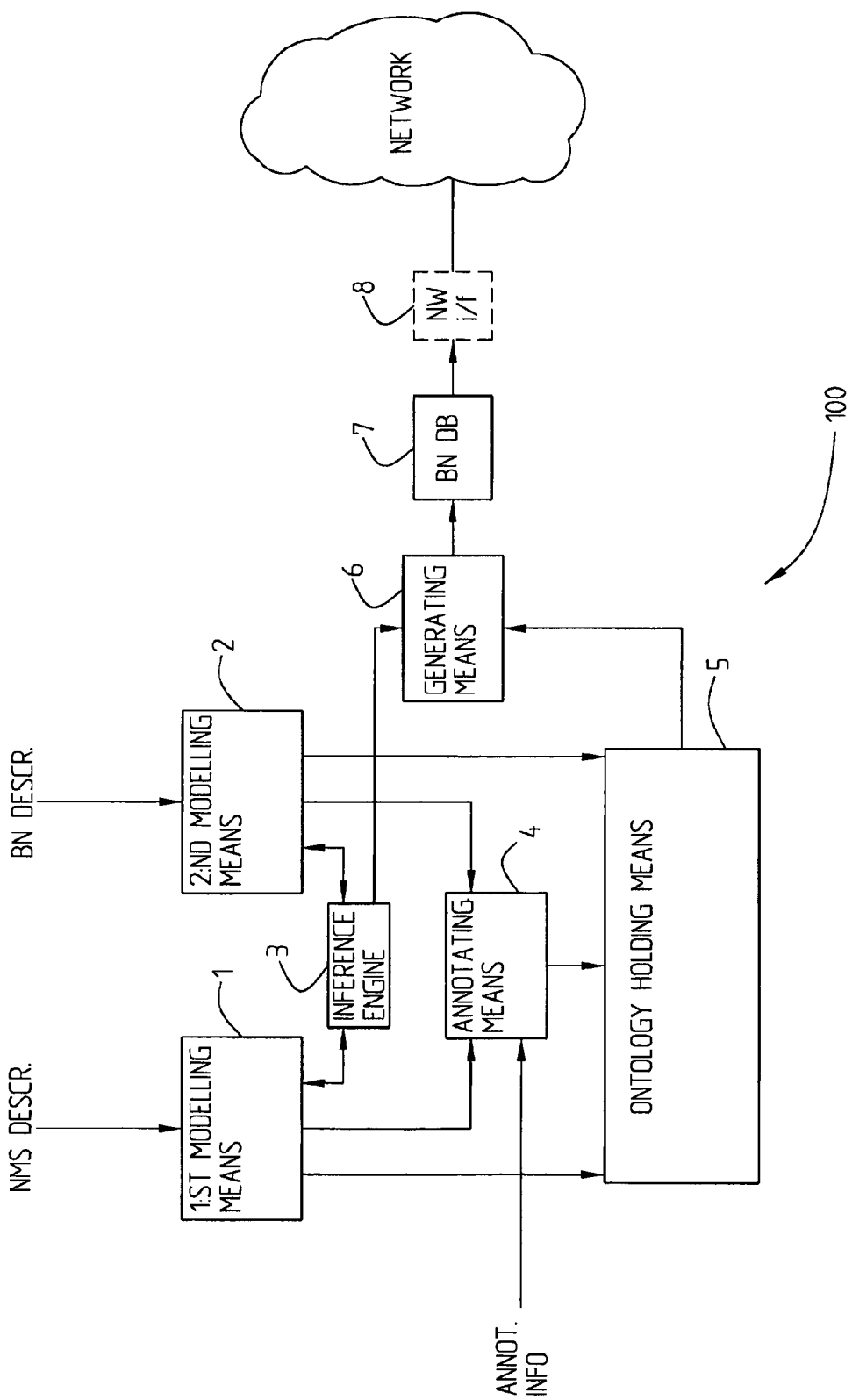
FIG. 1 is a schematical block diagram of an arrangement according to an embodiment of the invention.

The present invention particularly suggests an arrangement and a method by means of which probabilistic causal graph structures, for example Bayesian Networks, can be derived using the inference or reasoning capabilities offered by its formal ontologies relying for example on Description Logics and/or Frame Logics. This means that the creation of probabilistic causal networks can be highly automated. Expert knowledge is assumed to be represented in formal ontologies and the inventive concept further relies on the diverse inference or reasoning capabilities of the formal ontologies to create a structure of a probabilistic graph model, derive the causal relationships between graph nodes and, where possible, suggest initial transition probabilities.

As discussed above, probabilistic graph structures, such as Bayesian Networks, are representations of domains applied to monitoring and manipulating cause and effects for modelled systems such as mobile telecommunications networks. Ontologies are also a structured representation of knowledge, encoding facts and rules about a given domain. According to the present invention the knowledge and inference capabilities inherent in an ontology model are used to automate the construction of Bayesian Networks (or more generally probabilistic causal graph structures) to accurately represent a domain of interest. According to a general aspect of the invention an adaptive, self-configuring network management system is suggested wherein an ontology model has the dual function of knowledge repository and facilitator of automated workflows and a generated BN serves to monitor the effects of management activity, particularly forming part of a feedback loop for self-configuration decisions and tasks.

Ontologies are a means of providing a structured representation of knowledge, from the generic real world to strictly domain-specific knowledge. By using an ontological representation, concepts in a given domain can be captured in order to provide a shared common understanding of this domain, enabling interoperability and knowledge reuse in addition to machine-readability and reasoning about information through inferencing. Ontologies are deterministic and consist of concepts and facts about a domain and their relationships to each other. Probabilistic graph structures, particularly Bayesian Networks, comprise a means of estimating complex probabilities of states based on graphical models of a domain. They are furthermore a structured representation of knowledge and specify the relationships between concepts (or variables) of a domain. These relationships denote the dependencies and independencies that hold between the concepts or variables. They are probabilistic as also discussed above.

This means that there are two tools for knowledge representation. According to the invention the knowledge representation and inference capabilities of ontologies are used to automatically construct a probabilistic causal graph model, for example a Bayesian Network, which accurately represents a given domain which then particularly can be used to support machine decision-making processes.

In a self-managed network, the ontology model is designed to provide the self-configuring functionality facilitating automation of configuration workflows and it also serves as a repository of knowledge for the construction of a machine learning Bayesian Network component. The Bayesian Network component in turn is designed to provide the adaptive functionality, monitoring and learning the effects of configuration actions and closing the feedback loop on management activity.

The concept BN will be briefly discussed. A BN consists of a Directed Acyclic Graph (DAG) structure. The nodes of this graph represent variables from an application domain, for example performance counters in a telecommunications network. Ontologies represent knowledge in terms of concepts and relations.

Ontological concepts, in Bayesian Network terms, are domain variables which can take certain values and have an associated probability distribution which is represented as nodes in the BN graph. In this document the terms concept, variable and node are interchangeably used to denote concepts in the ontology model and variables in the BN DAG.

The arcs in the graph represent the dependencies that hold between variables. As an example, a drop in a parameter X triggers a service Y (e.g. as in FIG. 12). Additionally there is an associated conditional probability distribution of the variables which encodes the probability that the variables assume their different values given the values of their parent variables in the BN graph structure. For example, the probability of service Y being triggered when parameter X is above a given threshold is $p=1$.

It should be noted however that the arcs of a BN do not necessarily denote a causal relationship between two variables but only that the distribution of the child variable value is dependent on its parents value. In some instances this may be a causal relationship, but not always.

According to the present invention an arrangement and a method are suggested for derivation of a probabilistic causal graph structure, (e.g. BN), causality relations between nodes in the graph and additional conditional distribution probabilities from domain and behaviour information expressed in formal ontologies relying on e.g. DL or FL as discussed above.

Therefore, in an advantageous implementation, the modelling means of the arrangement comprise first modelling means with computing means adapted to receive a substantially non-formal description of a network management service and to create a first formal model of a network management service comprising formal ontologies. The modelling means further comprise second modelling means adapted to, from a written description of a probabilistic network model, create a formal probabilistic network description comprising formal ontologies to provide a second formal model. The modelling is normally done outside the node, manually e.g. using an ontology editor, but the modelling means are still seen, at least conceptually, as forming part of the arrangement. This is applicable or relevant also for the annotating means, or the annotating step. Advantageously the annotating means are adapted to receive or use information about network characteristics to be observed comprising the semantic information referred to above, and annotate the first formal model, hence providing an annotated formal model describing said characteristics. As referred to above, this can be done manually. Particularly the arrangement comprises ontology holding means adapted to hold said first formal model, said second formal model and said annotated formal model. The arrangement comprises an inference engine implementing inference or derivation rules (inherently) included in the formal ontologies, and further comprises generating means adapted to communicate with or comprise said inference engine. The generating means are adapted to implement the ruling of the inference engine on the annotated formal model to build or generate a formal, probabilistic graph model.

In particular embodiments the first and second formal models are adapted to be updated in agreement with the annotated formal model identifying characteristics to be observed, and the generation means are adapted to, in communication with the inference engine, provide for updating of the formal probabilistic graph model.

In a preferred implementation the probabilistic causal network model comprises a Bayesian Network, the probabilistic graph model comprising Bayesian Network graph structures.

In a preferred embodiment the arrangement comprises storing means for holding the probabilistic graph structures, for example a Bayesian Network database.

According to the invention the first formal model particularly comprises a formal domain and behaviour model, whereas the second formal model comprises a probabilistic graph domain model (e.g. describing types only).

Preferably the generating means are adapted to automatically generate a Bayesian Network structure, which comprises BN nodes, BN causal relationships and transition probabilities. In preferred implementations the first and second modelling means are adapted to use a modelling language based on Description Logics (DL), e.g. OWL (Ontology Web Language) or SWRL (Semantic Web Rule Language), and/or Frame Logics (FL), e.g. F-logic, or WSML (Web Services Modelling Language) for DL and FL, to provide the formal ontologies.

In a preferable implementation the annotating means are adapted to perform the annotation using semantics provided by the formal ontologies of the implemented ontology modelling language, e.g. comprise one or more of sub-classes, sub-properties and inference (derivation) rules, preferably at least some of the annotations being generic.

The arrangement particularly, in one application, is adapted to receive current network data to be observed and to use the probabilistic graph structures comprising prediction capabilities to establish or forecast node failure, node misfunctioning, to provide information assisting in making self-management decisions. Particularly the arrangement is arranged in a node that needs to be managed, or connected to such a node. The node may be in principle any node requiring to be managed or with advantage being managed such as a radio access network node, for example an RBS (Radio Base Station), an RNC (Radio Network Controller), or more generally a router which may be wireless or not, a mobile terminal, for example a PDA (Personal Digital Assistant) etc.

In different embodiments the arrangement is partly or entirely provided in the node, or entirely provided externally of the node to be managed. The modelling means are generally always provided externally, and the modelling is normally done manually, e.g. by means of an ontology editor.

In some embodiments, particularly if the node is a node with a considerable CPU (Central Processing Unit) capacity, or a high processing power, large storing capacity etc., e.g. an RNC, the whole arrangement (except for the modelling means and e.g. the annotating means) are located in the node. Of course the whole arrangement can be provided in the node itself for all types of nodes where it is possible. In other embodiments, for example only the database holding the generated graph structures (BN database) is provided in the node. In still other embodiments one or more of the generating means and/or inference engine and/or the ontology holding means are also provided in the node. In still other nodes, e.g. with a low processing power, or low storing capacity etc., such as mobile stations, either all means, or most means of the arrangement are provided externally, e.g. in a supernode or one or more information distribution nodes, which may be common for a plurality of nodes, e.g. MS:es or nodes in general of different kinds.

Accordingly the invention also suggests a method as described earlier, which may include features corresponding to the preferred or optional features discussed with reference to the arrangements.

In the block diagram of FIG. 1 an arrangement 100 according to one embodiment of the present invention is provided in a network node (of any kind). The arrangement comprises (external, manually operated) first modelling means 1 (e.g. conceptual) adapted to use a network management service (NMS) description substantially non-formal (e.g. based on knowledge, manuals etc.) particularly developed by an expert in natural language. The modelling means 1 are adapted to create (manually) a formal domain behaviour model using ontologies as will be more thoroughly discussed below. The arrangement also comprises (external, manual) second modelling means 2 adapted to receive or use a non-formal Bayesian Network description to create a formal probabilistic domain graph model using ontologies, as also will be more thoroughly described below with reference to FIGS. 5, 6. The arrangement also comprises an inference engine 3 which comprises the inference capabilities inherently provided by the formal ontologies. The node furthermore comprises annotating means 4 representing a manual annotating step normally performed externally comprising provisioning of annotating information, particularly external information about network characteristics to be observed. These characteristics will be expressed in ontology concepts in the formal NMS model, i.e. the first formal model. The annotating means 4 are adapted to link these concepts with the second formal model, for example using "isa"-relationships and ontology rules which also will be more thoroughly discussed below. The annotation process is illustrated in FIG. 7.

Figure 8:
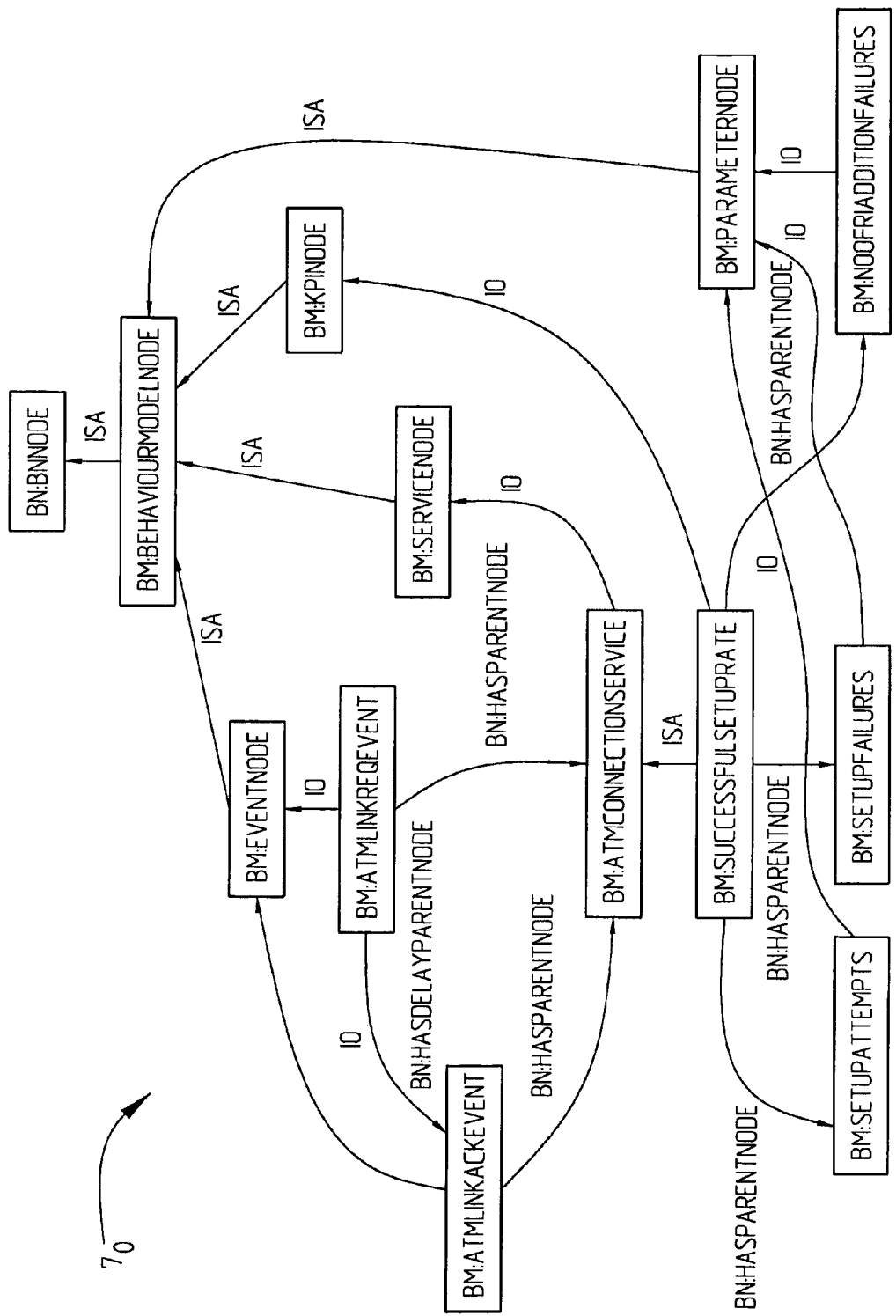
FIG. 8 shows a generated domain and behaviour formal ontology model, as provided by the generating step.
Figure 9:
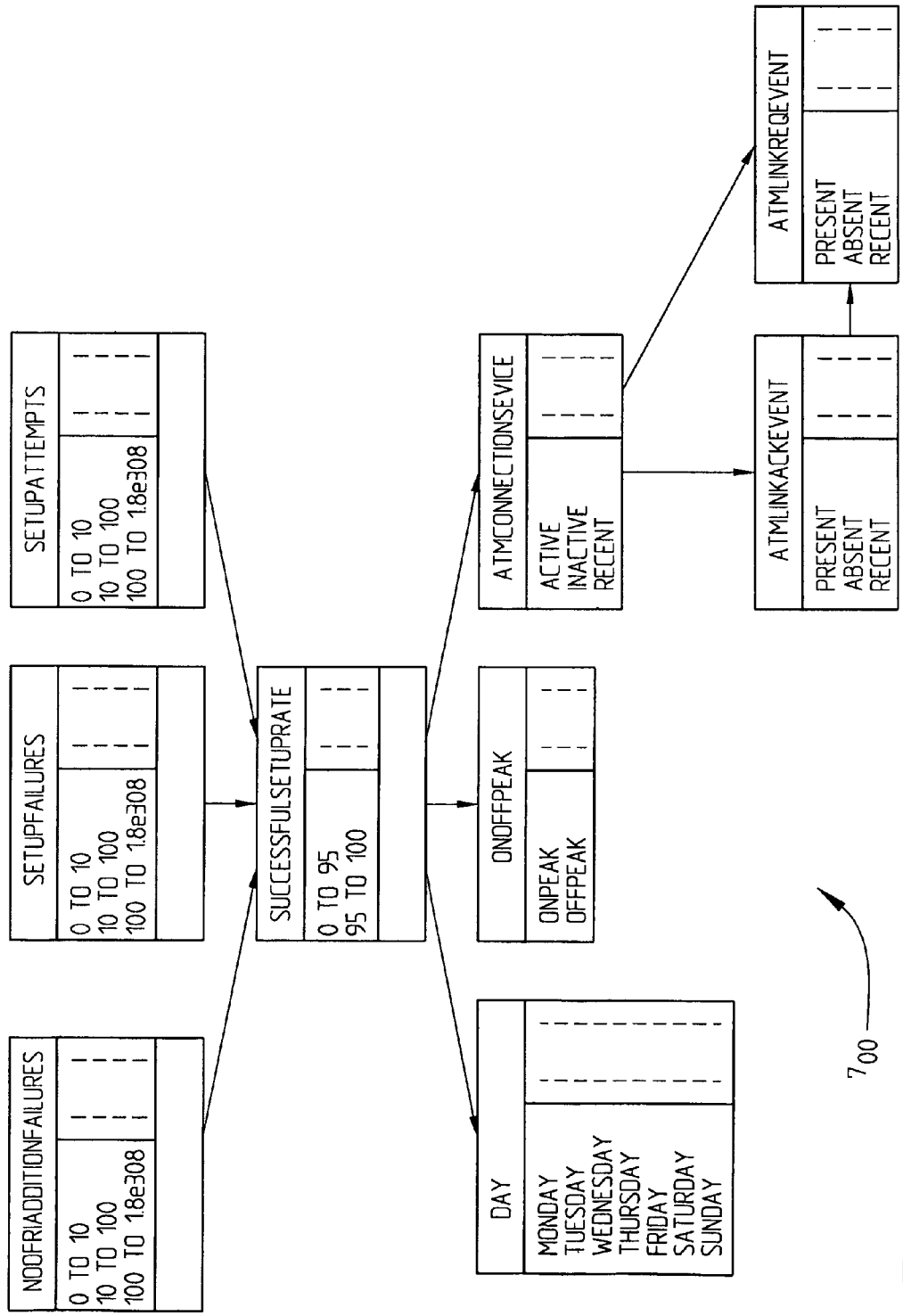
FIG. 9 shows an example of a final BN graph structure according to one embodiment of the invention.

The arrangement further comprises ontology holding means 5 adapted to hold the first formal model, the second formal model and the annotated formal NMS model which is obtained by means of the annotating means 4. Generating means 6, as will be more thoroughly described below, use the inference engine 3 over the previously developed formal models, (first formal model, second formal model and annotated model), to automatically generate the structure of the (here) Bayesian Network. Structure here means BN nodes, BN causal relationships and transition probabilities. FIG. 8 below shows the result of the process carried out by the generating means 6, whereas FIG. 9 shows an example on final BN graph structures. The BN graph structures generated by the generating means 6 are stored into Bayesian Network database 7 (which communicates with the network over network interface 8 which however does not form part of the general concept of the present invention).

As referred to above, one or more of the inference engine 3, the ontology holding means 5, the generating means 6 and the BN DB 7 is/are provided in or externally of a node (not shown) to be managed. In a particular embodiment it is supposed that (only) the BN DB is arranged in the node.

Figure 2:
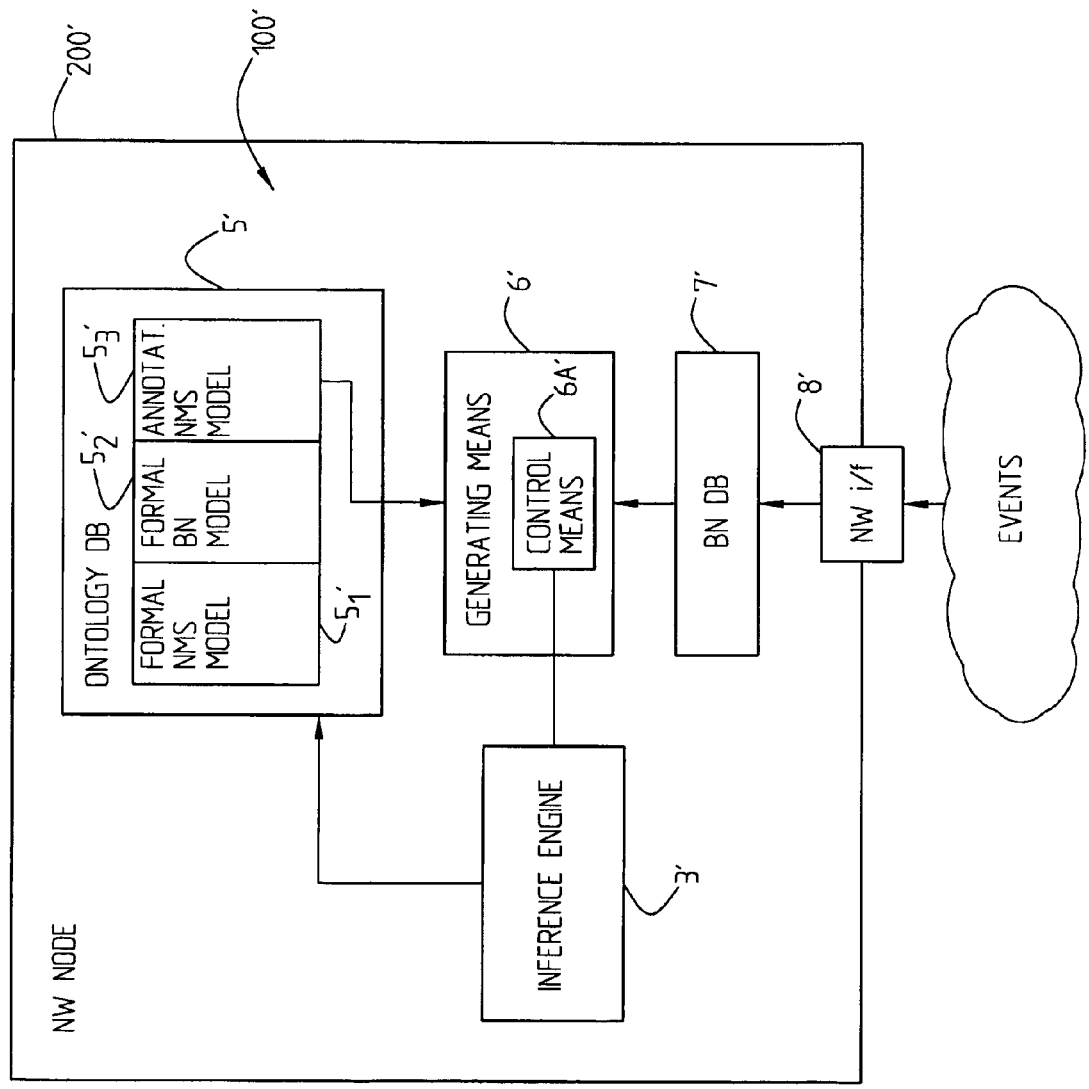
FIG. 2 is a block diagram of one specific embodiment of an arrangement according to the invention.

FIG. 2 shows a network node 200' in which an arrangement 100' according to the inventive concept is implemented, here hence supposed to be provided in the node.

The arrangement 100' comprises or communicates with first and second modelling means as discussed above (not shown) and comprises an ontology database 5' comprising a first storage 5', for a formal NMS model, a second storage 52' for a formal BN model and a third storage 53' for an annotated NMS model. The storages can be implemented as separate databases or be included in a common ontology database as in FIG. 2. Also, generally the formal models can be loaded into the ontology database 5' of the network node 200' in any appropriate manner. The arrangement comprises generating means 6' comprising control means 6A' adapted to use inference engine 3' and the ontology database information 5' to generate BN graph structures to be stored into the BN database 7'. In one application network events are received on the network interface 8' of the network node and the BN database 7' is updated. It should however be clear that this merely describes how a BN model generated according to the present invention can be used in the network node. It can be used to store live network data that comes in the form of events and the prediction capabilities of the BN model can be used to find node mis-functioning, node failures etc. It should however be clear that this merely relates to one implementation and it does not form part of the general, broad scope of the present invention.

Figure 3:
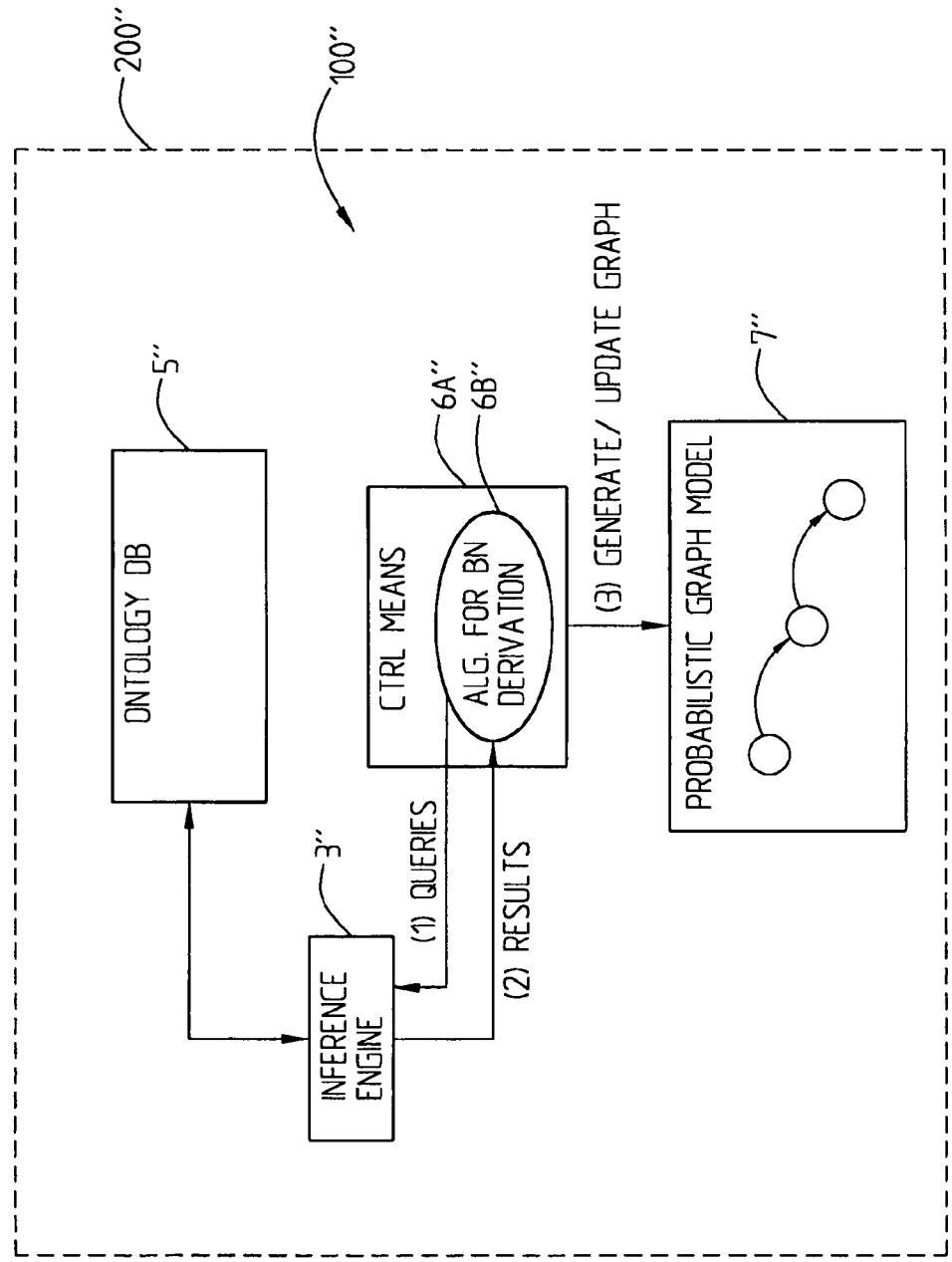
FIG. 3 is a block diagram describing the interaction between entities of an arrangement according to the invention to generate/update a probabilistic graph model.

FIG. 3 describes a network node 200" incorporating an arrangement 100" according to the present invention and it is intended to describe the elaboration of an algorithm for derivation of a BN. In FIG. 3 the formal ontology DB 5", the inference engine 3" and control means 6A", comprising an algorithm 6B" for the BN derivation, are shown and resulting probabilistic graph models are stored in BN database 7". Basically the elaboration of the algorithm 6B" consists in using the first and second formal ontologies and the annotations or annotated formal ontologies discussed above (and stored in formal ontology DB 5") together with classification and inference capabilities provided through the inference engine 3" to derive a probabilistic graph model to be stored in BN database 7". The inference engine 3" is a generic control mechanism using ontologies and ontology instances to reason over knowledge. The algorithm uses the formal ontology knowledge through the inference engine application programming interface (API) providing communications with the formal ontology DB 5". The algorithm queries the formal ontologies and their instances through the inference engine interface and then builds (and updates) the probabilistic graphical network model. It should be clear that different algorithms can be elaborated depending on annotation concepts developed in the annotating means. The algorithms can be very generic or less generic depending on the requirements of the developer to handle some types of relevant BN concepts in a different way than the way suggested in the generic algorithm. The algorithm elaboration procedure is not intended to provide a definitive algorithm, but rather to show how to automatically build a BN graph which is relevant and consistent with domain knowledge, by using formal ontologies and their built-in classification and inference or reasoning capabilities.

The inventive concept fundamentally comprises three main features or steps of which a first is provided by first and second modelling means and consists of modelling network domain and behaviour inside a network node by means of formal ontologies. A second basic feature is the annotating means and comprises adding additional semantic information in the domain and behaviour descriptions required for the BN. The third feature relates to generating means adapted to elaborate an algorithm using the formal ontologies inference capabilities to intelligently extract relevant behaviour information and derive the BN graph structure. Conditional distribution probabilities are also suggested from the ontological models where possible.

By means of the first and second modelling means, it is intended to capture domain and behaviour information. Information about the domain of the service and its behaviour characteristics are captured by using modelling languages supporting formal ontologies based on Description Logics (DL) and/or Frame Logics (FL) as discussed earlier. The modelling results in a number of formal ontologies representing in a general way the service characteristics and their domain. These formal ontologies can be used for various purposes like knowledge sharing, reuse etc. One such purpose is the creation of a probabilistic causal network.

Figure 4:
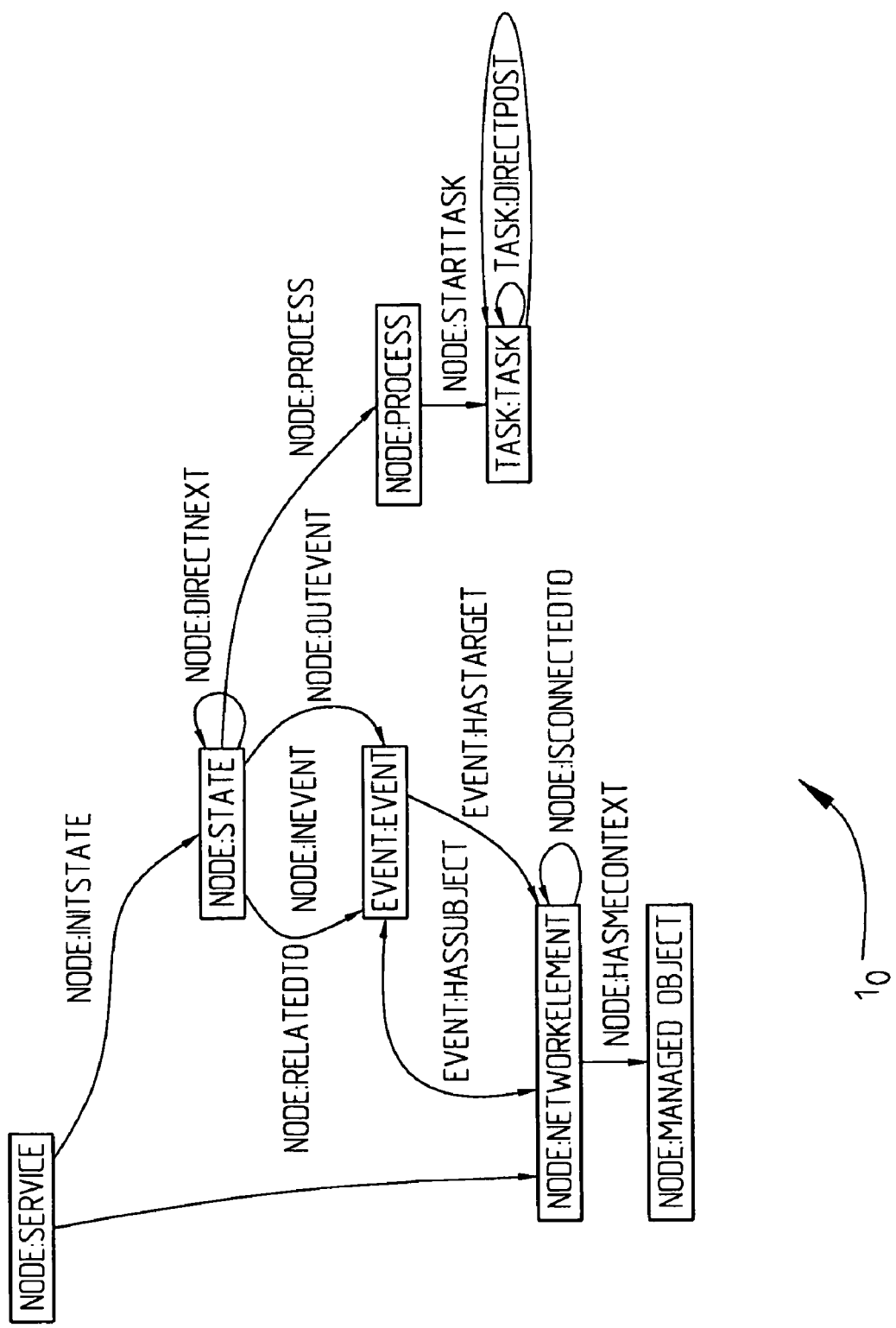
FIG. 4 illustrates one example of a first formal model comprising a formal Network Management Service (NMS) domain ontology, FIG. 5 a node concept of a probabilistic graph model comprising a BN node.

The domain ontology model for a single network device stores the current configuration of the device, its relationships with other objects in the network and constraints on its possible configuration imposed by the hardware and software deployed on the network element. It also stores the workflows associated with configuration tasks, i.e. the sequence of actions affecting a network element that needs to be completed in order to fulfill a given task. In addition thereto it models the performance and fault metrics associated with that node, (for example alarm types, performance counters and KPIs) and any associations between these, for example KPI equations and alarm triggers. A subsection of such an ontology $1_O$ modelled in OWL is shown in FIG. 4. This ontology subsection is focused on the generic Service concept and other concepts connected to it. The relations between the concepts are expressed by directed links (arcs with arrows) representing object properties of concepts. Links lead from property domain to property range concepts. The model is used to generate an accurate BN representation of the service domain, that e.g. can be used for monitoring effects of the management tasks to be performed and to facilitate automation thereof. This simply is one example of a formal NMS model.

Figure 5:
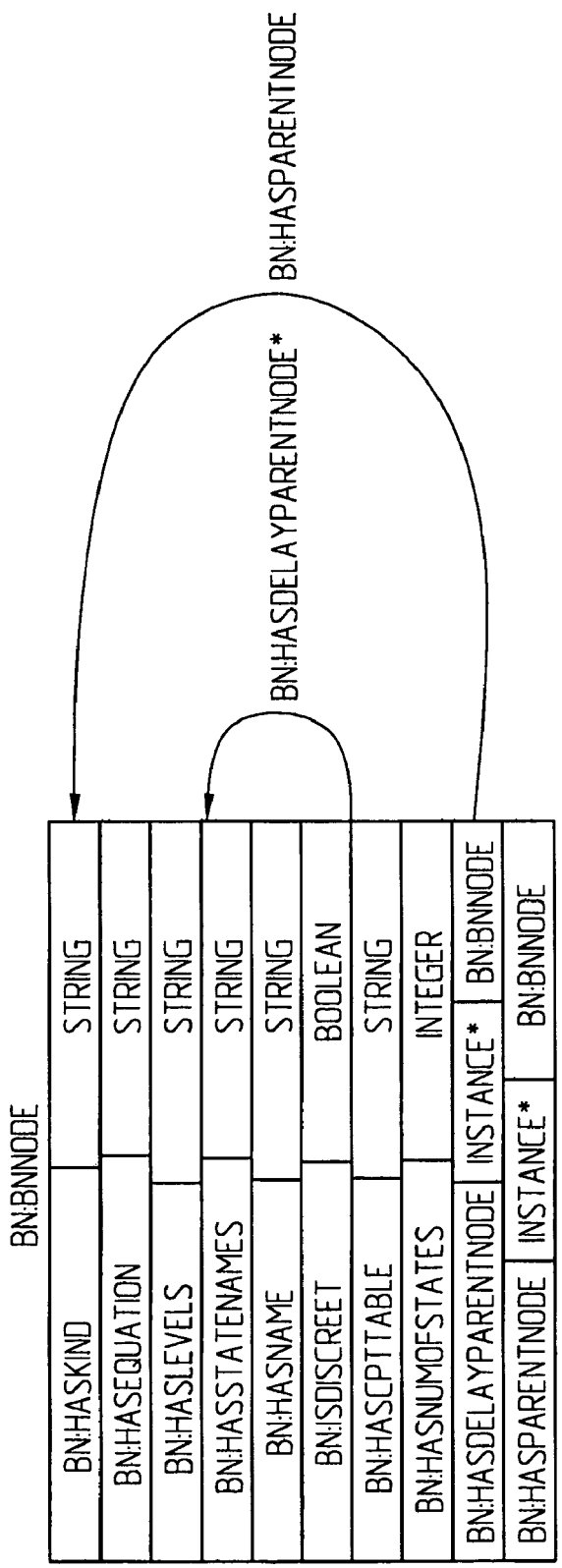
Figure 6:
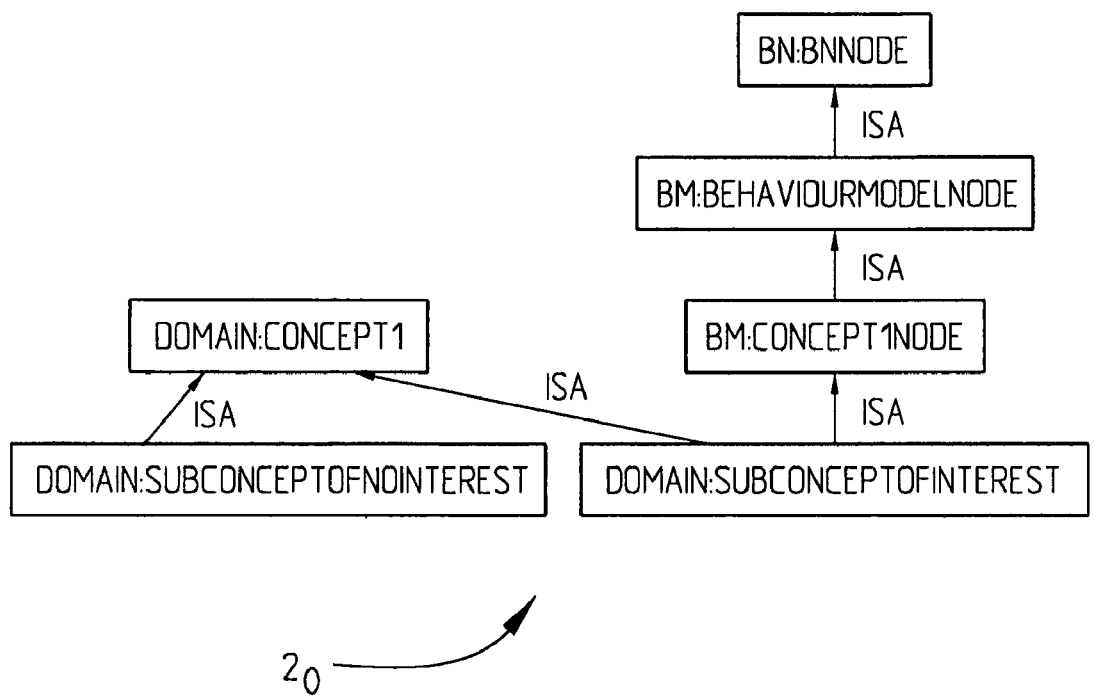
FIG. 6 illustrates an example of a second formal model, here a BN model.
Figure 7:
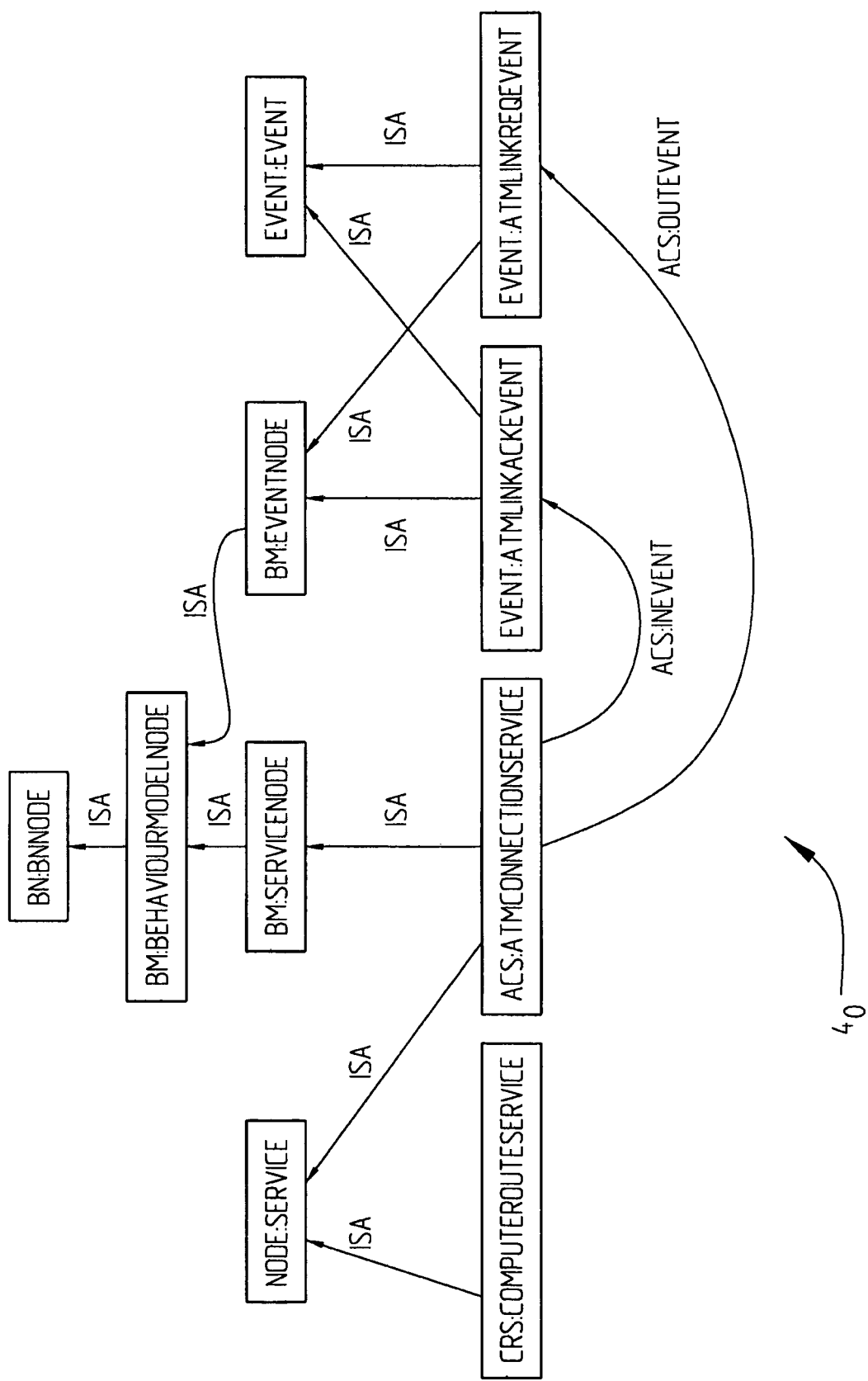
FIG. 7 illustrates an example of an annotated formal model.

With reference to FIGS. 5 and 6 the second modelling means or step for creation of a formal BN model will be more thoroughly discussed and exemplified. According to the present invention it is assumed that an ontology of concepts for the domain of interest is built. Some of these concepts may be of interest to include in a BN which models causal relations in that domain and some may not. In order to distinguish between them, a new ontology of BN concepts is provided and linked to the original domain ontology. All concepts of interest for the Bayesian Network then inherit from a node in the new BN ontology. The root concept of the BN ontology is the BN node. In order to create the BN, an instance of each leaf class which inherits from the BN node class is created. The description of the generic BN node concept, its properties and relations are illustrated in FIG. 5. The concept has two types of relations, namely: hasParentNode: BN nodes have directed link from themselves to at least one parent node; hasDelayParentNode: this is a directed time-delay link which can be used to generate a dynamic BN, i.e. a BN including a temporal dimension.

When a BN node instance is created, the relations referred to above define the influential links between this BN node instance and other BN node instances. In building the BN from the behaviour model ontology, the ontology reasoner is used over the hierarchy and its restrictions to create nodes in a network and to populate the properties of those nodes. An instance is created for each BehaviourModelNode subclass, in the domain model. The algorithm also generates a node in the BN representation with appropriate property values. To create arcs between these nodes, the algorithms rely on rules which are specific to the application domain and define which ontology properties or relations between concepts correspond to arcs in the BN. Thus a rule-based approach over ontology classes provides a means of specifying generic BN relationships which then are generated automatically when the nodes are initialised. Finally, the reasoner is used to check the generated Bayesian Network by checking all BN node instances and the domain ontology for consistency.

The BN concept properties listed in FIG. 5 constitute the set of possible attributes which a BN node can contain. They include name, conditional probability table (CPT), state names (for discrete variables, the list of values which the variable the node represents can take), levels (for continuous variables, the ranges of values which the variable can take). When a BN node instance of a domain concept is created, these attributes are derived from properties of that concept in the domain ontology. For specification of the attributes of BN node, the properties specified in the BN node concept of the BN nodes created at the previous step, must be derived from the combined BN node and domain ontology. These properties include name, state Names, type of BN node etc. This is done using the constraints offered by ontology restrictions. The domain concepts specify restrictions on their properties and these are used to populate the BN node properties of newly created BN nodes. For example a restriction hasValue specifies the values which a property can assume. The hasStateNames BN node property, which all sub-concepts of BNnode inherit, can be constrained in the sub-concept class to a specific value of the domain ontology concept property using the hasValue restriction. Other restrictions can be used to control correct node notation. As an example, the requirement that a node must have exactly one name can be expressed by a cardinality restriction hasName property=1. The ontology inheritance structure allows some restrictions to be specified at a very generic level, for example notational restrictions, and others at a lower level in the ontology, for example value specifications, in order to maximise the extent to which the ontology can be generalized. For each created BN node instance, the ontology reasoner gets all restrictions and the BN node properties are generated therefrom.

By defining inheritance relations between concepts of interest in the domain ontology and the BN node concept, it becomes possible to automate the creation of BN nodes, their attributes and the arcs connecting them, as will be more thoroughly explained below. The inheritance relation to BNnode expresses that a class of the domain model is to be included as a node in the behaviour model. This combined ontology is enriched with facts which describe how a domain can be represented as a Bayesian Network. The combined domain and BN ontology can be further enriched to constrain BN creation. In addition to the basic BN node concept, the BN ontology may contain additional BN concepts which are more specific either to the BN application or to characteristics of the domain ontology. FIG. 6 illustrates a simple ontology for a particular telecommunication network management application. The root concept of the BN ontology remains the BN node. The domain ontology in FIG. 6 consists of the concepts domain:SubConceptOfNoInterest and domain:SubConceptOfInterest and their parent concept domain:Concept1. The domain:SubConceptOfInterest concept inherits both from the domain ontology and the BN ontology and only this concept node will be included in an output BN for this domain. In FIG. 6 there are, however, between the root node and a conceptofInterest node, two additional, intermediate concepts: BehaviourModelNode and bmConcept1Node. The former represents the characteristics of BN nodes required for a particular application, in this case the NMS application. This separation between pure BN and BN for an application allows the original generic BN node ontology to be re-used for other applications which require a BN component by defining a different Application Node concept. The Concept1Node concept defines characteristics of Concept1 instances which have been treated in a particular way. The ontology can define a hierarchy of more specific BNnode classes for any domain concepts which should be included in the output BN, if these concepts would benefit from additional processing. It should be clear that the additional level is an option and it is not a requirement for the functioning of the inventive concept. The structure however enables tailored processing of domain ontology concepts in the generation of the BN, for example, setting ranges for continuous variables or default probability values.

Once the first formal model and the second formal model have been provided, additional semantics are added by the annotating means to the first and second formal ontologies in order to annotate concepts relevant for observation in the formal ontologies. The annotation is done using the various semantics that the formal ontologies provide through the corresponding ontology modelling language. The most relevant one s are sub-classes, sub-properties and derivation rules. Subclass relationships (i.e. is-a relationships) can be used to mark concepts as being of interest for observation (for example the concept ConfigurationService is a InterestingForObservation Concept). Sub-property relationships can be used to mark properties of concepts (for example parameters) as being of interest for observation (e.g. Parameter trafficRate in concept Router is a subPropertyOf ObservationProperty). Inference or derivation rules can be used to model more complex annotations (e.g. if a concept is classified as a Condition concept then the concept is a InterestingForObservationConcept). Inference rules can also be used to model, in a generic way, specific causal relationships (for example any input and output events in a service description have a causal relationship between them).

To summarize the purpose of the annotation is to annotate the formal ontologies (first and second formal model) in order to, in an intelligent way, use the inference and classification capabilities offered by formal ontologies to discover "entities" and their causal relations interesting for observation. These annotations can be generic, i.e. cover a big number of concepts such as the derivation rule referred to above or more specific, related to concrete concepts and properties as also described above ("is a subPropertyOf").

This is also described and exemplified with reference to FIG. 7. The BehaviourModelNode is the root class for any node to be included in the BN. Below this node, there is a hierarchy of more specific node classes for each node type to be included (for example KPI, Performance Parameter, Service and Event) to allow customer processing of the different node types. A part of the combined BN and domain ontology for the application domain is shown in FIG. 7 where is-a links represent the inheritance hierarchy. The ontology defines two classes, ServiceNode and EventNode, as subclasses of BehaviourModelNode to describe properties of the service and event domain concepts which are specific to a BN representation. For example, all service nodes in the BN share the same state names. This data and other shared property values are recorded using hasValue restrictions on the corresponding ServiceNode properties. Likewise, all event nodes share the same state names, different from service node state names. The EventNode subclass contains this information in the form of has Value restrictions. Every service and event which is of interest to the BN network inherits from the ServiceNode subclass and the EventNode subclass respectively.

In order to generate arcs automatically from the domain ontology it is possible to use rules in e.g. the Jena rule language. (It should be noted that this of course only is one particular example of a language.) Rules specify how to create arcs from relations between domain concepts. The reasoner infers hasParentNode and hasDelayParentNode relations from inter-concept relations, cf. arcs in FIG. 7. After rule inference, the hasParent relations appear in the behaviour model ontology as shown in FIG. 8, which illustrates Domain plus Behaviour Model Ontologies after Rule Applications.

```
[Service-Event_arc_rule:
(?s type Service)      // if there is a service
(?e type Event)        // and an event
(?s ?p ?e)             // that is in relation with this service
  ->                   // then
(?e hasParent ?s)      // the event has the service as a parent
]
```

Likewise, for example, each KPI has its relevant performance parameters defined in the ontology as properties of the KPI concept. A generic rule for all KPIs generates Bayesian Network arcs to each KPI from their associated performance parameters. If there is no relation defined between classes in the domain ontology, it is also possible to define rules explicitly specifying arc creation. A final model may then be obtained which is checked for consistency and recreated as a Bayesian Network, such as for example the BN shown in FIG. 9. The Netica API (Application Programming Interface) may e.g. be used.

It should be clear that the models and graph structures illustrated in the figures are included exclusively for exemplifying and illustrative purposes and the invention is of course not limited to any details shown or indicated in these particular figures nor the use of any specific languages etc.

FIG. 9. shows one example of Bayesian Network for a set of eight variables from the telecommunications network domain. It consists of a Key Performance Indicator (KPI) for a telecommunications device, the performance counters contributing to that KPI, a service workflow which is triggered by degradation in the KPI levels and two temporal variables, day of the week and peak time. It should be clear that this is merely one example of a structure that can be built based on an ontology model of a telecommunications domain.

Below follows an example of a generic algorithm that can be used by the control means, cf. FIGS. 2, 3 or more generally the generating means 6;6' of e.g. FIG. 1 or FIG. 2 to build a Bayesian Network based on formal ontologies provided by the first and second modelling means as discussed above:

```
kb    -   knowledge base containing all formal ontologies and
          their instances. It offers three methods:
          -   classify(in concept) - classify the concept in the
              input parameter as of certain type.
          -   infer(in concept, out name, out values) - infers
              from the knowledge base the name to be used for this
              particular concept, as well as the range of possible
              values that the concept can take.
          -   inferCausalNodes(in concept, out causalities) -
              infers from the knowledge base the causal
              relationships of a given concept
bn    -   Bayesian network repository containing nodes, arcs
          between nodes and probabilities
          -   constructNode(in name, in values) - construct a node
              in the Bayesian Network with given name and values
          -   createArcs(in fromNodes, in toNodes) - construct
              causal arcs from the fromNodes to toNodes.
foreach concept c in the knowledge base kb
    kb.classify(c)
    if c classified as InterestingForObservation then
        foreach i related to c through relationship
            kb.classify(i).
            if i is InterestingForObservation then
                kb.infer(in i, out name, values)
```

-continued

```
                bn.constructNode(name, values)
                kb.inferCausalNodes(in, i, out nodes)
                if nodes not in bn then
                    bn.create(nodes)
                    bn.createArcs(from i, to nodes)
                endif
            endif
        endforeach
    endif
endforeach
```

Figure 10:
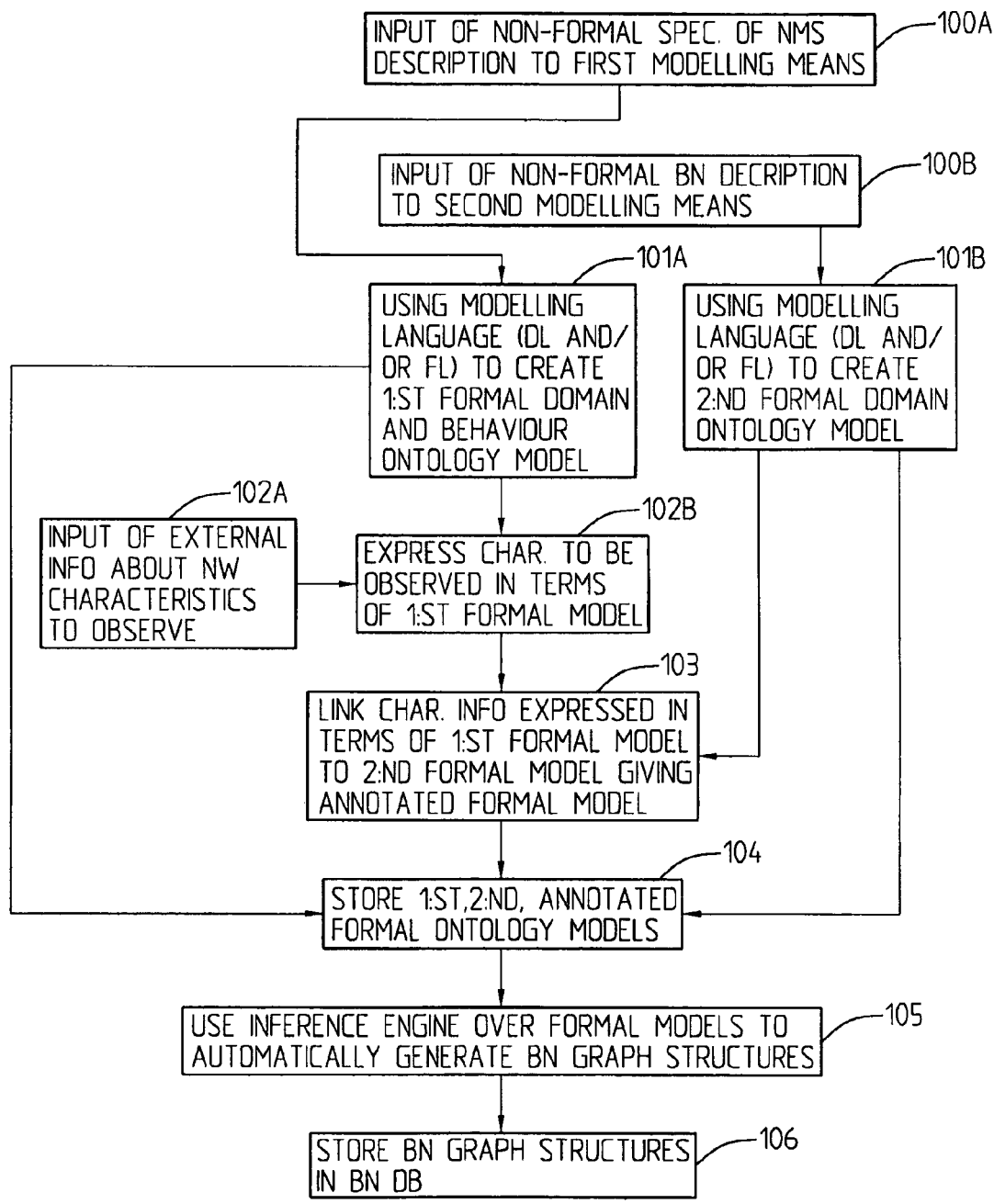
FIG. 10 is a schematical flow diagram describing a procedure according to the inventive concept.

FIG. 10 illustrates, in the form of a flow diagram, one implementation of the inventive concept. A substantially non-formal NMS description is used (e.g. manually), 10A, to, by means of a modelling language based on DL and/or FL create a first formal domain and behaviour ontology model, 101A. Moreover, a substantially non-formal BN description is used, 100B, in second modelling means (normally manually), to create a second formal domain ontology or a probabilistic graph domain model (e.g. describing the type), 101B, also using a modelling language based on DL and/or FL. By means of external information about network characteristics to be observed, 102A, expressed in terms of the first formal model, 102B, the characteristic related information hence expressed is linked to the second formal model giving an annotated formal model, 103. The first, second and annotated formal ontology models are stored, 104, in an ontology DB. The inference engine (inherent) is used over the formal models to generate (realized) BN graph structures, 105, which then are stored in a BN DB (in a node to be managed, or externally of such a node, the latter particularly if it is a "small" node with limited storage capacity and/or limited processing capacity).

In the following an example of a derived Bayesian Network using this algorithm will be briefly discussed.

Figure 11:
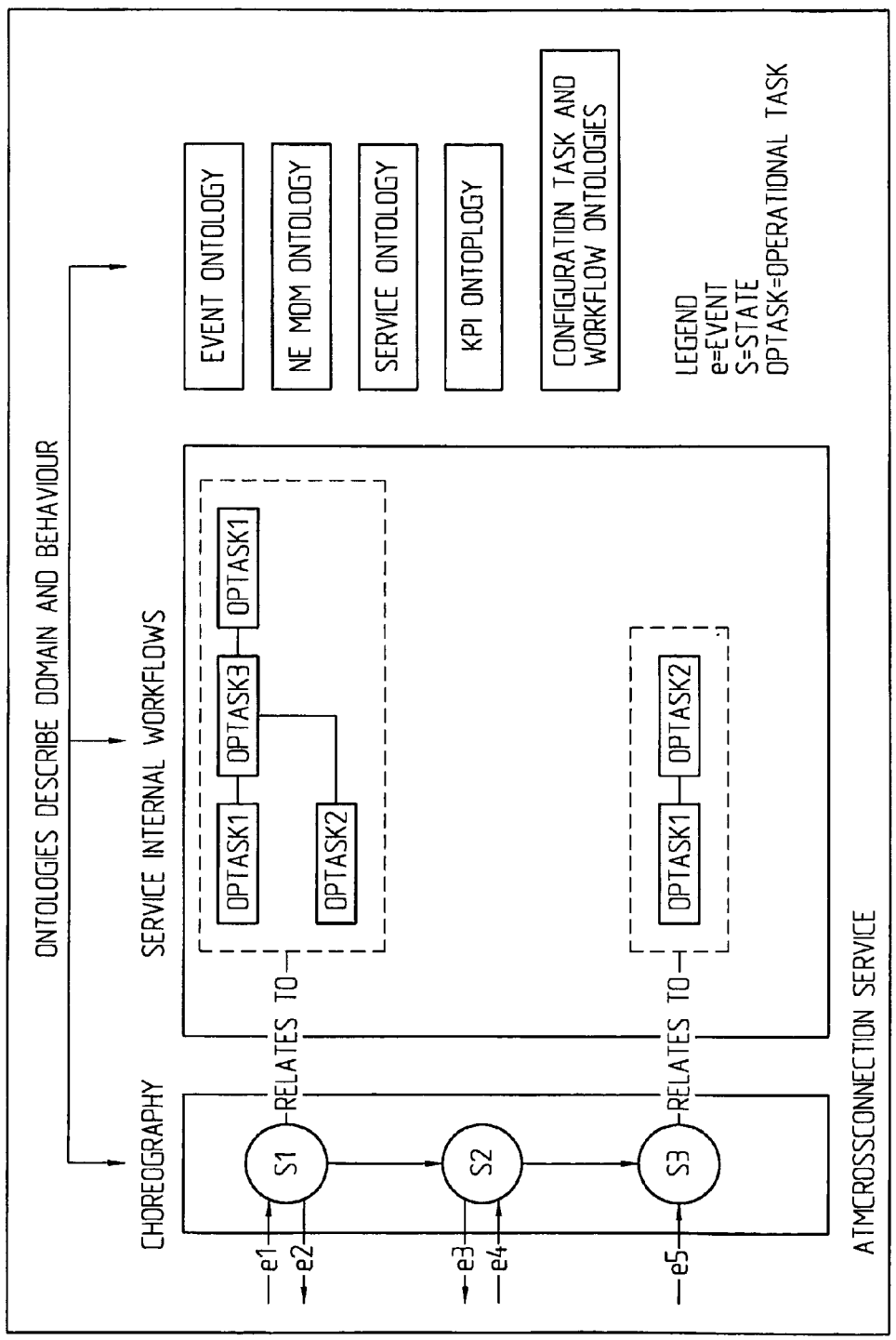
FIG. 11 shows an application on ontologies describing a specific service.
Figure 12:
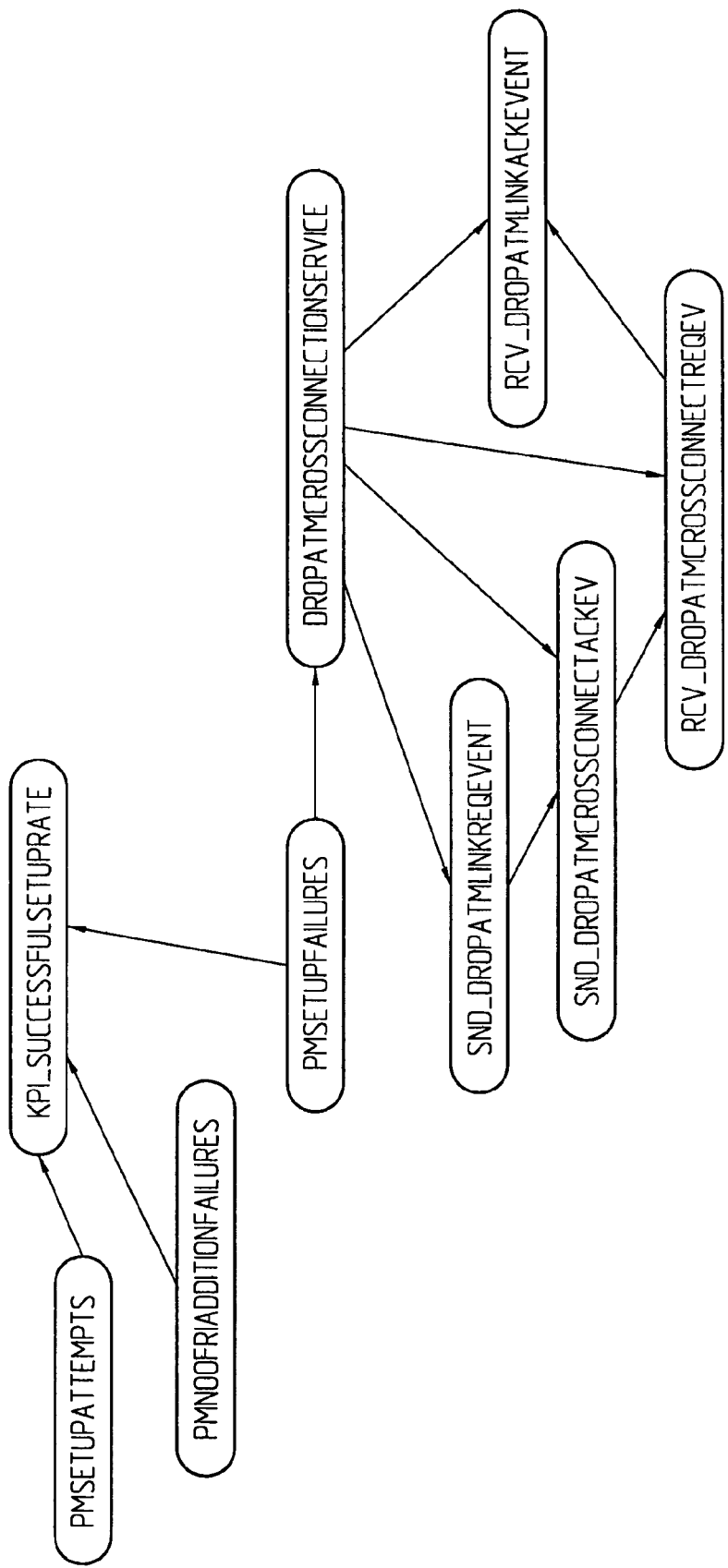
FIG. 12 shows an example of a derived BN graph.

Particularly standard languages may be used to represent ontological knowledge, such as e.g. OWL, and can be applied to standard service-oriented technologies (Web Services) and particularly standard W3C (WorldWideWeb Consortium) submissions (Semantic Web Services) which are likely to be standardized. Below will be described a Semantic Web Service for a particular configuration management task in a network device. It describes a functionality of the service and the types of ontologies required to model the domain and behaviour characteristics of the service (FIG. 11). FIG. 12 shows a derived Bayesian Network graph structure.

AtmCrossConnection service is a service that provides the capability to cross connect ATM connections. It can be implemented for example in a WCDMA RXI node. From a Semantic Web Service perspective, the AtmCrossConnection service has an external interface called choreography and internals, for example workflows building the ATM cross-connection. The choreography is inherently a finite state machine describing the type of events the service can receive and send in each of its states and transitional conditions to move from one state to another. Internals of the AtmCross-Connection service are workflows creating managed objects (MOs). These workflows contain a number of Operational Tasks (OpTask). In order to model the AtmCrossConnection service choreography and internals, ontologies can be used as follows:

Ontology: EVENT ONTOLOGY
Description: Models concepts about the events that the service can receive and send (e.g. request events, acknowledgement events).

Ontology: NE MOM ontology
Description: Models the Managed Object Model of the Network element (RXI) as an ontology.
Ontology: Service ontology
Description: Models the service choreography, i.e. states, state transitions, and choreography workflow.
Ontology: KPI ontology
Description: Models concepts about Key Performance Indicators and how they relate to various performance counters.
Ontology: Configuration tasks and workflow ontology
Description: Models the configuration tasks related to building the ATM CrossConnection.

FIG. 12 shows a Bayesian Network that has been derived using the algorithm described above and the formal ontologies describing the choreography and the internals of the AtmCrossCnnectionService described above. It particularly shows the causal relationships between dropping the service and the events that the service can receive and/or send. Moreover it shows the causal relationship of the AtmCrossConnectionService to the KPI SuccessfulSetupRate through the pmSetupFailures counter.

Of course FIGS. 11, 12 merely relate to a specific application of the inventive concept.

In general it should be clear that the invention is not limited to the specific embodiments described above, but that it can be varied in a number of ways within the scope of the appended claims. Actually it could also be implemented in other domains than within telecommunications management, for example more generally within data communications management or in other domains as well.

The invention claimed is:

1. An arrangement for network management and adapted to be provided in, associated with or in communication with, a network node to be managed, wherein the arrangement comprises, or is in communication with, modelling means adapted to, using non-formal descriptions, model network domain and behaviour using formal ontologies comprising inference capabilities by means of an inference engine, thus providing a formal ontology model describing domain and behaviour and annotating means adapted to add semantic information to the formal domain and behaviour ontology model, generating means adapted to, using said formal ontology model and said inference engine, elaborate an algorithm adapted to generate and update a probabilistic causal network graph structure representing the domain and its behaviour.

2. An arrangement according to claim 1, wherein said modelling means comprise first modelling means with computing means adapted to, from an input substantially non-formal description of a network management service, create a first formal model of the network management service comprising formal ontologies, and second modelling means adapted to, from an input written description of a probabilistic network model, create a formal probabilistic network description comprising formal ontologies to provide a second formal model.

3. An arrangement according to claim 1, wherein the annotating means are adapted to receive information about network characteristics to be observed comprising said semantic information, and to annotate the first formal model using the formal ontologies of the second formal model hence providing an annotated formal model describing said characteristics.

4. An arrangement according to claim 2, comprising ontology holding means adapted to hold said first formal model, said second formal model and said annotated formal model.

5. An arrangement according to claim 4, wherein the inference engine is adapted to implement inference or derivation rules included in the formal ontologies, that the generating means are adapted to communicate with or comprise said inference engine, said generating means further being adapted to implement the ruling of the inference engine on the annotated formal model to build or generate a formal probabilistic graph model.

6. An arrangement according to claim 5, wherein the first and second formal models are adapted to be updated in agreement with the annotated formal model identifying characteristics to be observed and in that the generating means are adapted to, in communication with the inference engine, update the formal probabilistic graph model.

7. An arrangement according to claim 6, wherein the probabilistic graph model comprises Bayesian Network graph structures.

8. An arrangement according to claim 7, wherein the probabilistic network model comprises a Bayesian Network.

9. An arrangement according to claim 6, comprising storing means for holding the probabilistic graph structures.

10. An arrangement according to claim 2, wherein the first formal model comprises a formal domain and behaviour model.

11. An arrangement according to claim 2, wherein the second formal model comprises a probabilistic graph domain model.

12. An arrangement according to claim 7, wherein the generating means are adapted to automatically generate a Bayesian Network (BN) structure, said structure comprising BN nodes, BN causal relationships and transition probabilities.

13. An arrangement according to claim 2, wherein the first and second modelling means are adapted to use a modelling language supporting formal ontologies, based on Description Logics (DL), and/or Frame Logics (FL), or based on DL and FL using WSML to provide the formal ontologies.

14. An arrangement according to claim 13, wherein the annotating means are adapted to perform the annotation using semantics provided by the formal ontologies of the implemented ontology modelling language comprising one or more of sub-classes, sub-properties and inference rules, at least some of the annotations being generic.

15. An arrangement according to claim 1, wherein the arrangement is adapted to be at least partly arranged in a network node or connected to a network node comprising a radio access network node.

16. An arrangement according to claim 9, wherein at least the storing means holding the probabilistic network model or graph structures is provided in the network node.

17. An arrangement according to claim 16, wherein the generating means, and/or the inference engine and/or the ontology database is/are provided in the network node.

18. An arrangement according to claim 16, wherein the generating means and/or the inference engine and/or the ontology database is/are provided externally of a network node to be managed, in a supernode or in one or more information distribution nodes.

19. An arrangement according to claim 9, wherein the generating means, the inference engine, the ontology database, the storing means holding the probabilistic graph structure are provided externally of a network node to be managed in a supernode or one or more information distribution nodes.

20. An arrangement according to claim 1, wherein the arrangement is adapted to receive current network data to be observed and use the probabilistic graph structures comprising prediction capabilities to detect or forecast node failure, node malfunctioning and to provide information assisting in self-management decisions.

21. A method for network management implemented in or in association with a network node, comprising the steps of:
- modelling network domain and behaviour models using formal ontologies comprising inference capabilities to provide a formal ontology model domain and behavior description;
- adding, in an annotating step, semantic information to the formal domain and behaviour ontology model; and
- elaborating an algorithm adapted to generate and update a probabilistic causal graph structure using said formal ontology model and said inference capabilities.

22. A method according to claim 21, wherein the modelling step comprises:
- receiving a substantially non-formal description of a network management service;
- creating therefrom a first formal model of the network management service comprising formal ontologies;
- receiving a written description of a probabilistic network model; and
- creating therefrom a second formal model of the probabilistic network model comprising formal ontologies.

23. A method according to claim 22, wherein the annotating step comprises:
- achieving information about network characteristics to be observed comprising said semantic information; and
- annotating the first formal model using the formal ontologies of the second formal model to provide an annotated formal model describing said characteristics.

24. A method according to claim 23, comprising the step of:
- storing said first formal model, said second formal model and said annotated formal model in ontology holding means.

25. A method according to claim 24, wherein the algorithm elaboration step comprises:
- applying inference or derivation rules of the inference capabilities on the annotated formal model to elaborate an algorithm for building or generating the formal probabilistic graph structure model.

26. A method according to claim 21, comprising the step of:
- updating, automatically, the formal probabilistic causal graph structure model depending on the observed characteristics.

27. A method according to claim 21, comprising the step of:
- storing the probabilistic graph structures in a database, in the network node or in an external information distribution node.

28. A method according to claim 21, wherein the modelling step comprises:
- using a modelling language supporting formal ontologies based on Description Logic, Frame Logic or Description Logic and Frame Logic to provide the formal ontologies.

29. A method according to claim 28, wherein the annotating step comprises:
- using semantics provided by the formal ontologies of the implemented ontology modelling language, at least some of the annotations being generic.

30. A method according to claim 21, wherein the method used to manage a network node.

31. A method according to claim 21, comprising the steps of:
- receiving network events on a network interface of the network node, in the database holding the probabilistic graph structures; and
- using the probabilistic causal graph structures to predict behaviour, and to make self-management decisions based on the updated graph structures.

* * * * *